United States Patent Office 3,007,902
Patented Nov. 7, 1961

3,007,902
CURING POLYOLEFIN WITH N-OXYDIETHYLENE 2-BENZOTHIAZYLSULFENAMIDE
William M. Nelson, Bartlesville, Okla., assignor to Phillips Petroleum Company, a corporation of Delaware
No Drawing. Filed Mar. 17, 1958, Ser. No. 721,629
13 Claims. (Cl. 260—79)

This invention relates to polyolefins. In one of its aspects, this invention relates to the use of N-oxydiethylene-2-benzothiazylsulfenamide and certain derivatives thereof in polyolefins. In another aspect, this invention relates to a process for improving resistance to thermal and environmental stress cracking of highly crystalline polyolefins. In still another aspect, this invention relates to a method of improving film clarity prepared from highly crystalline polyolefins.

Polyolefins, especially polyethylene, have long been used for preparing film for wrapping food stuffs, various packages and the like. However, such film frequently tends to cloud unless certain precautions are taken. While this is true with polyolefins generally, it is especially true with the highly crystalline, high density polyolefins.

Polyolefins, especially polyethylene, have long been recognized as excellent insulating materials for electrical purposes, especially in high frequency applications. The polyolefins available until recently have been somewhat limited in application at high temperature due to their softening points. It has recently been discovered that high softening point, high density, highly crystalline olefin polymers can be prepared at comparatively low pressures in the presence of certain catalysts. These polyolefins, especially polyethylene, show many superior physical properties, such as high softening point, high tensile strength, etc. and can be subjected to sterlizing heat without deformation. On the other hand, such polymers have a tendency to crack or to rupture when exposed to conditions of stress at elevated temperatures. In some applications of these polyolefins, e.g., cable sheaths where the polymer is subjected to an active environment such as surface active agent, cracking occurs under stress that the polymer would ordinarily resist indefinitely. This latter type of failure has been termed environmental stress cracking. As a consequence, these highly crystalline polyolefins which are otherwise ideally suited for certain applications have had limited use for cable sheaths and the like.

An object of this invention is to provide a polyolefin suitable for film preparation;

Another object of this invention is to provide a polyolefin film of improved clarity;

Another object of this invention is to provide a highly crystalline polyolefin having high resistance to stress cracking;

Still another object of this invention is to provide a method for preparing highly crystalline polyolefins having high resistance to environmental stress cracking; and, Still other objects, features and advantages of this invention will be apparent to those skilled in the art having been given this disclosure.

According to this invention, polyolefins are blended with N-oxydiethylene-2-benzothiazylsulfenamide, an alkyl derivative, or a halogen derivative thereof, at a temperature below the reaction temperature of the additive and thereafter the blended polymer is heated to a temperature above said reaction temperature to effect cure.

The term "cure" is used herein to designate a reaction between the disulfide and the polymer which causes a reduction in the rate at which the polymer will flow through a given orifice under a given set of conditions. It is preferred that the blend be cured or heated to the point at which the rate of flow of the polymer through a given orifice under a given set of conditions will not decrease more than 50 percent when heated at 450 F. for an additional 10 minutes. One method of measuring such flow is by melt index as determined by ASTM method D1238–52T.

The starting polymers for the process of this invention can be characterized as aliphatic 1-olefin polymers which have a density of at least 0.89 and a crystallinity of at least 50 percent as determined by nuclear magnetic resonance at ambient temperature. In case of stress cracking resistance the polymer density is preferably at least 0.95 and the crystallinity is at least 80 percent. More preferably, the density is at least about 0.96 and the crystallinity is 90 percent or higher. Polyethylenes having the foregoing densities and crystallinities are preferred starting materials for the process for improving stress cracking resistance. However, polymers (including copolymers) of aliphatic 1-olefins generally can be improved in film clarity by the additive of this invention.

One method for preparing such highly crystalline material is set forth in the copending application of Hogan and Banks, Serial No. 373,877, filed March 26, 1956, now Patent No. 2,825,721. Polymers according to that application are produced by polymerizing 1-olefins having a maximum of eight carbon atoms per molecule and no branching nearer the double bond than the 4-position, either alone or with other olefins, by contacting with a solid catalyst containing as an essential catalytic ingredient, chromium oxide, associated with at least one porous oxide selected from the group consisting of silica, alumina, zirconia and thoria. Suitable olefins are ethylene, propylene, 1-butene, 1-pentene, 1-hexene, 1-octene, 4-methyl-1-pentene, 4-methyl-1-hexene, 4-ethyl-1-hexene, 6-methyl-1-heptene, 5-methyl-1-heptene and the like. These materials can be polymerized alone or in admixture with each other to obtain solid or semi-solid polymers. Also, these olefins can be polymerized with other aliphatic olefins, such as butene-2 and butadiene. It is preferred that the chromium content of the catalyst be within the range 0.1 to 10 weight percent and is highly preferable that an appreciable portion of the chromium be in the hexavalent state. The catalyst is finely divided and can be microspheroidal although the catalyst having particle sizes up to 40 mesh can be employed satisfactorily. A highly desirable catalyst is a chromium oxide catalyst associated with at least one additional oxide of the type already mentioned. A catalyst often preferred is one in which the oxide or oxides, other than chromium oxide, have been treated with the fluorides, e.g., a volative fluoride, such as hydrogen fluoride, followed by heating to remove residual volatile fluorides. A further improvement can be effected by the presence of strontium oxide in the catalyst as set forth in more detail in the copending application of Hogan and Banks, Serial No. 433,804, filed June 1, 1954, now Patent No. 2,846,425. As has been indicated, the preferred chromium content of the chromium oxide catalyst is in the range 0.1 to 10 weight percent and it is further preferred that at least 0.1 weight percent of the catalyst be chromium in the hexavalent state.

The catalyst can be maintained in suspension in the reaction mixture by any suitable agitation means. The reaction temperature in the Hogan and Banks method is preferably in the range 250 to 375 F. although temperatures outside this range can be used. For example, a process has been proposed for polymerizing such olefins in the presence of a chromium oxide catalyst of the type described at a temperature below the solution temperature of the polymer, e.g., as low as 150 F. or even lower so that the polymer is formed as discrete particles. In either case, solution or diluent processes, the pressure will be sufficient to maintain the hydrocarbon diluent or solvent in liquid phase. For convenience, the solvent or diluent will hereafter be referred to as diluent since even when acting as a solvent, this hydrocarbon also serves as a diluent for the reaction. While vapor phase reaction can be employed, the instant invention pertains to those polymerizations employing a liquid diluent. The reactor effluent is passed to a flash zone wherein unreacted monomer is removed by flashing. In the solution process, the solution after monomer removal is frequently filtered to remove the catalyst. In the particle form process (polymer formed as discrete particles), the production per pound of catalyst is exceedingly high and generally no catalyst removal step is required. The polymer can suitably be recovered from solution or diluent by admixing the effluent with relatively cool water which results in polymer precipitation in the case of solution and subsequent separation of the precipitated polymer by steam stripping the polymer to remove hydrocarbon diluent after which the polymer is dried, remelted, extruded and cut into pellets. Other recovery methods can be employed, such as by solvent evaporation, cooling solvent to below the precipitation temperature of the polymer, etc. However, this is not a part of the present invention and requires no further discussion here.

Polyethylene produced by the process just outlined will ordinarily have a molecular weight in the range 35,000 to 100,000 or even higher and in the case of particle form, for example, up to 200,000 or higher. The molecular weights mentioned herein are weight average molecular weights and were calculated according to the equation $$M = \frac{4.03 \times 10^3 \times N_1 \times 14}{2.303} = 24,500 N$$

wherein M is the weight average molecular weight and $N_1$ is the inherent viscosity as determined for a solution of 0.2 gram of the polymer in 50 cc. of tetralin at 130 C. This type of molecular weight determination is described by Kemp and Peters, Industrial Engineering Chemistry 35, 1108 (1943), and by Diene and Klemm, Journal of Applied Physics 17, 458 (June 1946). Density will be in the range 0.95 to 0.97, e.g., approximately 0.96 gm./cc. at 20 C. and crystallinity will exceed 90 percent as determined by magnetic nuclear resonance at 25 C. The tensile strength of the polymer as produced will ordinarily be of the order 4,000 to 5,000 p.s.i. but can be higher or lower. This tensile strength is greatly improved by orienting by cold drawing. The polymer ordinarily has a softening point of about 265 F. or higher. Polymers produced by this process have unsaturation which is preponderantly of the terminal vinyl and/or transinternal structure. So-called "branched vinyl" unsaturation is substantially absent. These terms are more fully discussed in the first cited Hogan and Banks application.

Another suitable (but less preferred and non-equivalent) method of preparing highly crystalline polymer is by polymerizing such olefins by contacting with a catalyst such as a mixture of a compound represented by the formula $AlR_3$ wherein R is a saturated aliphatic, cycloaliphatic or aromatic hydrocarbon radical or hydrogen; and a second component which is ordinarily a halogen compound of a metal such as titanium, zirconium, chromium or molybdenum. Another suitable catalyst, comprises a mixture of a compound represented by the formula $R_mAlX_n$ wherein R is a hydrocarbon radical of the type previously described, X is a halogen and $m$ and $n$ should each be at least one and $m+n=3$, i.e., the valence of aluminum. Along with this latter type of catalyst, metal compounds, such as titanium dioxide, and the tetraalkoxides of titanium, halides of titanium, as well as tetravalent titanium salts of organic carboxylic acids can be utilized. An example of such a catalyst is a mixture of diethylaluminum chloride, ethylaluminum dichloride, and titanium tetrachloride. A similar type of catalyst mixture comprises a halide of a group IV metal, e.g., titanium tetrachloride and a free metal, such as metallic sodium or metallic magnesium. The polymerization reaction with these catalysts is ordinarily conducted at a temperature which can range from room temperature up to approximately 300 C. The reaction is preferably conducted with the olefin in admixture with a hydrocarbon such as isooctane, cyclohexane or toluene which is inert and non-deleterious to the catalyst under the reaction conditions. The pressures are ordinarily sufficient to maintain the inert hydrocarbon in substantially the liquid phase. The reactor effluent is ordinarily treated with a compound such as methanol, acetone, acetic acid or water which decomposes the remaining catalyst and the polymer is recovered by vaporization of the hydrocarbon solvent or by precipitation of the polymer by cooling. Polymers produced by this general type of process will have molecular weights of the same order as those produced by the chromium oxide catalysts, a crystallinity of 80 to 85 percent and densities of about 0.94.

While both of the foregoing types of polymerizations can be carried out in batch processes, it is often preferred to carry out such processes continuously. In continuous processes, it is frequently preferred to carry out the reaction in a plurality of reactors in series. Continuous pocesses are within the skill of the art and need no further discussion here.

It will be noted that the foregoing specifications as to density and crystallinity are not satisfied by most of the polyethylenes which have hitherto been available on the market. Most such polyethylenes have been produced by polymerization at extremely high pressures, e.g., of the order of 10,000 p.s.i. or higher, usually in the presence of a peroxide type catalyst or without any catalyst. These materials ordinarily have densities of the order of 0.91 or 0.92 and crystallinities no higher than 60 percent in many cases. They ordinarily have molecular weights within the general range 5,000 to 30,000 and tensile strengths of the order of 1,500 to 2,000 p.s.i. The unsaturation in such polymers is preponderantly of the branched vinyl type.

The additive of this invention consists of N-oxydiethylene-2-benzothiazylsulfenamide wherein the carbon atoms in the aromatic nucleus can be substituted by halogen atoms or alkyl radicals with the total number of carbon atoms in the alkyl radicals ordinarily not exceeding six. That is, the composition can be represented by the formula

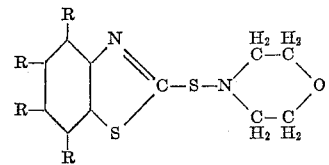

wherein R is selected from the group consisting of hydrogen, halogens, and alkyl radicals and wherein alkyl, the total number of carbon atoms in such alkyls does not exceed six. Examples of such compounds which are operable in this invention to improve environmental and thermal stress cracking and to improve film clarity include: N - oxydiethylene - 2 - (4 - methylbenzothiazyl) sulfenamide; N - oxidiethylene - 2 - (5 - methylbenzothiazyl)sulfenamide; N - oxydiethylene - 2 - (5,6 - dimethylbenzothiazyl)sulfenamide; N - oxydiethylene - 2 - (4,7 - dimethylbenzothiazyl)sulfenamide; N - oxydiethylene - 2 - (4,5 - diethylbenzothiazyl)sulfenamide; N - oxydiethylene - 2 - (5 - methyl - 6 - ethylbenzothiazyl)sulfenamide; N - oxydiethylene - 2 - (4,5,6,7-tetramethylbenzothiazyl)sulfenamide; N - oxydiethylene - 2 - (4,5,6-trimethylbenzothiazyl)sulfenamide; N - oxydiethylene - 2- (5,6,7 - trimethylbenzothiazyl)sulfenamide; N - oxydiethylene - 2 - (7 - isopropylbenzothiazyl)sulfenamide; N-oxydiethylene - 2 - (5,6 - di - n - propylbenzothiazyl)sulfenamide; N - oxydiethylene - 2 - (4 - n - butylbenzothiazyl)sulfenamide; n - oxydiethylene - 2 - (5 - tert - butyl-benzothiazyl)sulfenamide; N - oxydiethylene - 2 - (6 - n-amylbenzothiazyl)sulfenamide; N - oxydiethylene - 2 - (4 - n - hexylbenzothiazyl)sulfenamide; N - oxydiethylene - 2 - (4 - chlorobenzothiazyl)sulfenamide; N - oxydiethylene - 2 - (5,6 difluorobenzothiazyl)sulfenamide; N-oxydiethylene - 2 - (5,6 - diiodobenzothiazyl)sulfenamide; N - oxydiethylene - 2 - (7 - fluorobenzothiazyl)sulfenamide; N - oxydiethylene - 2 - (6 - iodobenzothiazyl)sulfenamide; N - oxydiethylene - 2 - (4 - methyl - 5 - chloro-benzothiazyl)sulfenamide; N - oxydiethylene - 2 - (5 - n-propyl - 6 - bromobenzothiazyl) sulfenamide; N - oxydiethylene - 2 - (4,7 - dichlorobenzothiazyl)sulfenamide; and N - oxydiethylene - 2 - (5 - ethyl - 6,7 - dichloro benzothiazyl)sulfenamide.

As has been indicated, these polyolefins compositions have improved clarity and in the case of the high density, highly crystalline olefin polymers they are made to exhibit high resistance to heat stress cracking and environmental stress cracking. The process generally involves, as a first step, the incorporation into the polymer, N-oxydiethylene-2-benzothiazylsulfenamide or certain derivatives thereof at a temperature at which the compound is stable, preferably not above about 350 F. and thereafter raising the temperature to a level at which the additive becomes active, e.g., at least 425 F. and curing the polymer at this elevated temperature. The additive may be incorporated into the olefin polymer by any suitable manner such as on a roll mill or by a Banbury mixer. In a preferred embodiment, the mixing temperature is at least as high as the melting point of the polymer and will generally not exceed 350 F. and in any case must be below the temperature at which any appreciable reduction in flow through an orifice, as previously described, occurs. Mixing is continued until uniform composition is obtained. The additive can also be blended with the polyethylene by coprecipitation, dry blending and the like.

The additive of this invention is generally employed in a range between 0.0001 and 10 weight parts per 100 parts polymer. For use in film, the preferred range is 0.0001 to 0.2, frequently below 0.1 weight part per 100 parts of polymer. The preferred range for thermal stress and environmental cracking resistance is 0.1 to 10 weight parts per 100 parts polymer, frequently between 1 and 5 weight parts per 100 parts polymer. After the polymer has been raised to a temperature of about 425 F. it is preferred that the polymer be molded before the additive becomes fully reacted. The time will be dependent largely upon the percent of additive. It is also preferred that the additive be given sufficient time at the elevated temperature to substantially fully react as indicated by stabilization of flow rate as previously indicated. In the case of heavy loading with additive, e.g., over about 2½ percent, the polymer becomes prematurely cured if not used immediately and yet all the additive has not reacted. In such a case, a post cure at a temperature above about 425 F. is desirable. It has been found that in the case of additive loadings up to about 2½ percent, suitable extrusions or other moldings can be made without post curing and therefore a more preferred range of additive loading is in the range 1½ to 2½ weight percent. This is particularly advantageous in injection molding wherein the polymer is generally heated to a temperature in the range 450–600 F. just prior to the molding, e.g., the die temperature. In the case of compression molding, the material, after blending, can be put into the mold and then heated to effect cure. In this case, the time is not critical and heavier loading of additive can be readily handled. Curing occurs at a more rapid rate with the higher loading and this means that the molding time which can be tolerated is shorter than with the lower loading. If curing goes too far before molding (or extrusion) is completed (evidenced by a drop in the melt index), the product will be rough. In such cases, the material flows with difficulty and the finished article will not be satisfactory.

Subsequent to incorporation of the additive in the olefin polymer, the composition is ready for molding or film forming. For the molding or film forming operation, the temperature of the composition is raised to at least 425 F. as has been indicated and preferably between 450 to 600 F. During the interval required for molding or film forming, the additive undergoes some type of reaction which results in a pronounced drop in the melt index, i.e., one measure of flow rate, of the polymer. While this invention is not dependent upon any particular reaction mechanism, it is possible that the additive generates free radicals. At high temperatures employed during molding or film forming operation, curing of the polymer occurs. This reaction results in an improvement in stress cracking resistance of the polymer composition and in a clearer polymer. One advantage of operating in accordance with the process of this invention, is that the composition remains easily processable until it reaches the molding or film forming temperature and there is sufficient time to accomplish the forming operation before pronounced drop in the melt index occurs. As has been previously indicated, when the additive loading is greater than about 2½ to 3 percent some additional cure time may be required as previously discussed. Other ingredients such as antioxidants, fillers, dyes, pigments, etc. can also be incorporated in the polymer as desired.

If desired, the molded article can be passed to a heating zone where the temperature is maintained in the range between 425 and 600 F. to complete the curing step which has been initiated during the molding operation, usually 5 to 60 minutes. While this post curing step is not mandatory and is generally not required at low additive levels, e.g., as is generally employed for film, it does allow time for the additive to exert its maximum effect upon the polymer whereas the reaction might otherwise be only partially completed.

This invention will be further illustrated by the following examples wherein polyethylene as prepared in the presence of chromium oxide catalyst is utilized. These examples are given to illustrate the invention in one of its preferred embodiments and should not be taken as limiting as those skilled in the art will understand similar improvements can be had with other polymers and other additives as disclosed.

*Example 1*

Ethylene was polymerized in a continuous process in the presence of a chromium oxide-silica-alumina catalyst and in cyclohexane according to the method of Hogan and Banks, supra, to give three polymers of the following properties:

|  | 1 | 2 | 3 |
|---|---|---|---|
| Volatiles, wt. percent | 0.04 | 0.03 | 0.03 |
| Ash, wt. percent | 0.00 | 0.00 | 0.00 |
| Melt Index [1] | 0.11 | 0.10 | 0.13 |
| M.I.,[2] percent | +9 | −30 | −31 |
| Density | 0.963 | 0.963 | 0.958 |
| Impact Strength, Izod, foot lbs./inch notch: [3] |  |  |  |
| Sprue | 13.1 | 14.1 | 11.82 |
| Gate | 8.96 | 8.0 | |
| Compression Molded: [4] |  |  |  |
| Tensile, p.s.i. | 4,248 | 4,088 | 4,268 |
| Elongation, percent | 30 | 30 | 30 |
| Stiffness, p.s.i. |  |  | 142,000 |
| Antioxidant [5] added, wt. percent | 0.02 | 0.02 | 0.02 |
| Analyzed, wt. percent | 0.0188 | 0.009 | 0.012 |

[1] ASTM D1238-52T.
[2] Melt index change after 500 F. injection molding.
[3] ASTM D256-54T—Impact strength was determined at each end of the mold bar.
[4] ASTM D412-51T.
[5] 2,6-di-tert-butyl-4-methylphenol.

A physical mixture of approximately equal parts of the above polymer was blended. Two parts by weight of N-oxydiethylene-2-benzothiazylsulfenamide was blended on a roll mill at 300 F. with 100 parts by weight of the polyethylene blend. The molten polymer composition was extruded onto a No. 14 wire. Cylinder temperature of the extruder was 440 F. and the die temperature was 450 F. Temperature of the stock was 500 F. Another piece of wire was coated with polymer containing no additive.

Three pieces of each wire were treated by wrapping them around their own diameter and subjecting them to a temperature of 212 F. (thermal stress cracking test; sample placed in an oven). The time for surface cracks to appear, i.e., for the coating to fail, was observed. The pieces containing no additive failed on an average of 6 hours whereas the pieces containing additive did not fail after 1000 hours when the test was discontinued.

*Example II*

To the above prepared polyethylene a small amount of N-oxydiethylene-2-benzothiazylsulfenamide was added on a Banbury mill. This material was blown into a film and the following data obtained:

| Additive, parts by wt./100 parts polymer | 0.1 | 0.0 |
|---|---|---|
| Stock temperature, ° F | 470 | 475 |
| Density | 0.963 | 0.960 |
| Melt Index | 0.48 | |
| Haze, percent | 52 | 91 |
| Thickness, mils | 1.8 | 1.5 |
| Burst Strength:[1] | | |
| Thickness, mils | 1.8 | 2.0 |
| Feet | 1.5 | 2.0 |

[1] Measured by dropping a baseball (softball) through a predetermined height onto a circular area of 8 inches in diameter of taut film. The results in feet, is the maximum height from which the ball can be dropped five times on different places on the film without breaking it.

*Example III*

Variable quantities of N-oxydiethylene-2-benzothiazyl-sulfenamide were incorporated into polyethylene as described above by mixing on a roll mill at a temperature of approximately 300 F. using a ten-minute milling period. Films were blown from the samples and various physical properties were determined on each film. Results were as follows:

| | 1 | 2 | 3 | 4 | 5 | 6 |
|---|---|---|---|---|---|---|
| Additive, parts by wt./100 parts polymer | 0.05 | 0.005 | 0.005 | 0.0005 | 0.0005 | |
| Stock temperature, ° F | 510 | 510 | 560 | 510 | 560 | 525 |
| Density | 0.959 | 0.959 | 0.960 | 0.960 | 0.960 | 0.960 |
| Burst strength: | | | | | | |
| Thickness, mils | 2.2 | 2.5 | 1.5 | 2.0 | 3.0 | 1.8 |
| Feet | 1.5 | 3 | 1 | 2 | 2.5 | 2 |
| Tensile, p.s.i.: | | | | | | |
| Machine direction | 3,718 | 4,534 | 3,896 | 4,390 | 3,328 | 4,288 |
| Transverse direction | 3,206 | 4,148 | 3,854 | 4,420 | 3,372 | 4,188 |
| Tear strength, g./mil: | | | | | | |
| Machine direction | 350 | 438 | 303 | 390 | 296 | 454 |
| Transverse direction | 338 | 405 | 388 | 418 | 381 | 407 |
| Haze, percent | 28 | 48 | 38 | 60 | 56 | 68 |
| Thickness, mils | 1.9 | 2.4 | 1.7 | 1.9 | 2.6 | 1.5 |
| Melt index | 0.35 | 0.68 | 0.46 | 0.42 | 0.35 | 0.87 |
| Elongation, percent: | | | | | | |
| Machine direction | 271 | 304 | 169 | 170 | 10 | 356 |
| Transverse direction | 18 | 123 | 21 | 67 | 10 | 154 |

*Example IV*

N-oxydiethylene-2-benzothiazylsulfenamide, 0.02 part by weight, was incorporated into 100 parts of a highly crystalline polyethylene similar to that described above. Three films were blown from the composition using blow-up ratios of 2/1, 3/1 and 4/1. Physical properties were determined on the film as follows:

| | Runs | | |
|---|---|---|---|
| | 1 | 2 | 3 |
| Additive, parts by wt./100 parts polymer | 0.02 | 0.02 | 0.02 |
| Blow-up ratio | 2/1 | 3/1 | 4/1 |
| Stock temperature, ° F | 500 | 500 | 500 |
| Burst strength: | | | |
| Thickness, mils | 2.0 | 1.5 | 1.5 |
| Feet | 6 | 2.5 | 1.5 |
| Haze, percent | 38 | 39 | 36 |
| Thickness, mils | 1.9 | 2.0 | 1.5 |

The above examples are given to illustrate the advantages of the invention and are not to be taken as limiting since any of the compounds disclosed will give similar results with the olefin polymers disclosed. For example polymer of ethylene prepared in the presence of $Al(C_2H_5)_3$ and $TiCl_4$ shows similar improvement in haze reduction with the additive of this invention.

I claim:

1. A composition of matter comprising a polymer of an aliphatic 1-olefin having incorporated therein at least 0.0001 weight part per 100 parts of said polymer a compound as the sole curing agent having the formula

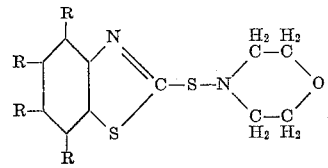

wherein R is selected from the group consisting of hydrogen, halogen and alkyl radicals and wherein the total carbon atoms in alkyl groups do not exceed 6, said composition having been heated to a temperature of at least 425° F. to effect cure.

2. A process for treating a polymer of an aliphatic 1-olefin having a crystallinity of at least 50 percent and a density of at least 0.89 which comprises blending said polymer with a stabilizing amount of a compound as the sole curing agent having the formula

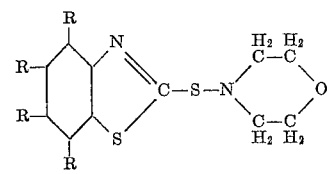

wherein R is selected from the group consisting of hydrogen, halogen and alkyl groups and wherein the total carbon atoms in alkyl groups do not exceed 6, at a temperature below temperature at which said stabilizing compound reacts with said polymer to effect a viscosity increase therein at 450° F. over a period of 10 minutes and thereafter heating the blended composition above said temperature to effect cure.

3. A process for improving stress cracking resistance in a highly crystalline, high density polymer of an aliphatic 1-olefin which comprises blending said polymer with a stabilizing amount of a compound as the sole curing agent having the formula

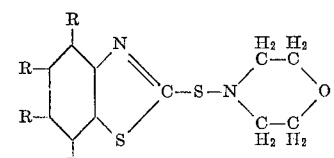

wherein R is selected from the group consisting of hydrogen, halogen and alkyl radicals and wherein the total carbon atoms in alkyl groups do not exceed 6, at a temperature below the temperature wherein said stabilizing compound does not decrease the rate of flow of the polymer through a given orifice under a given set of conditions by more than 50 percent when heated to 450° F. for 10 minutes and thereafter heating the blended composition above said reaction temperature to effect cure.

4. A process for stabilizing highly crystalline polyolefins against stress cracking which comprises blending a polymer of an aliphatic 1-olefin having a crystallinity of at least 70 percent and a density of at least 0.94 with 0.1 to 10 weight percent of a compound as the sole curing agent having the formula

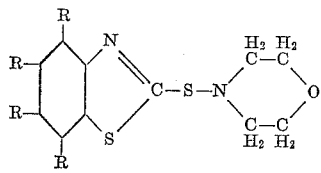

wherein R is selected from the group consisting of hydrogen, halogen and alkyl radicals and wherein the total carbon atoms in alkyl groups do not exceed 6, at a temperature above the softening point of said polymer and not higher than 350° F. and thereafter heating the blended composition to at least 425 F. to effect cure.

5. The process of claim 4 wherein the polymer is polyethylene.

6. A process for preparing a molded object of polyethylene of a density of at least 0.94 and a crystallinity of at least 80 percent stable against environmental stress cracking which comprises heating a polyethylene of said density and crystallinity to a temperature in the range between the softening temperature of said polyethylene and 350 F., blending into the soft polyethylene 1 to 5 weight parts based on total polyethylene a compound as the sole curing agent having the formula

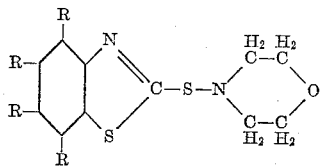

wherein R is selected from the group consisting of hydrogen, halogen and alkyl radicals and wherein the total carbon atoms in alkyl groups do not exceed 6 to obtain a substantially homogeneous blend, heating the resulting blend to a temperature within the range 450–600 F. and immediately molding the composition to the desired shape.

7. The process of claim 6 wherein the molded composition is maintained at a temperature of at least 425 F. until the rate of flow of the composition through a given orifice does not decrease more than 50 percent when said composition is heated at 450 F. for an additional 10 minutes.

8. The process of claim 7 wherein said compound blended into the polyethylene is N-oxydiethylene-2-benzothiazyl sulfenamide.

9. A molded polyolefin resin resistive to stress cracking and prepared from a polymer of an aliphatic 1-olefin having a crystallinity of at least 70 percent and a density of at least 0.94 said resin having been prepared by the method of claim 3.

10. A process for preparing a polyolefin film of improved clarity which comprises blending a polymer of an aliphatic 1-olefin having a crystallinity of at least 70 percent and a density of at least 0.94 with 0.0001 to 0.2 weight percent of a compound as the sole curing agent having the formula

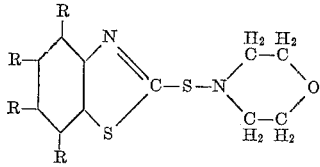

wherein R is selected from the group consisting of hydrogen, halogen and alkyl groups and wherein the total carbon atoms in alkyl groups do not exceed 6, at a temperature above the softening point of said polymer and not higher than 350 F., thereafter heating the blended composition to at least 425 F. and forming the film therefrom.

11. The process of claim 10 wherein the polymer is polyethylene.

12. A process for preparing a polyethylene film of improved clarity which comprises heating polyethylene of a density of at least 0.94 and a crystallinity of at least 80 percent to a temperature in the range between the softening point of said polyethylene and 350 F., blending into the soft polyethylene 0.0001 to 0.1 weight part per 100 parts of said polyethylene a compound as the sole curing agent having the formula

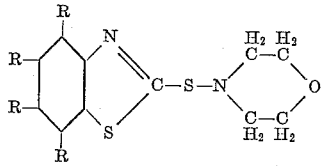

wherein R is selected from the group consisting of hydrogen, halogen and alkyl groups and wherein the total carbon atoms in alkyl groups do not exceed 6, to obtain a substantially homogeneous blend, heating the resulting blend to a temperature within the range 450–600 F. and immediately forming a film therefrom.

13. The process of claim 12 wherein said compound blended into the polyethylene is N-oxydiethylene-2-benzothiazylsulfenamide.

References Cited in the file of this patent

UNITED STATES PATENTS

| 2,582,510 | Stiratelli | Jan. 15, 1952 |
| 2,727,879 | Vincent | Dec. 20, 1955 |
| 2,758,995 | Sullivan | Aug. 14, 1956 |

FOREIGN PATENTS

| 571,943 | Great Britain | Sept. 17, 1945 |